United States Patent
Bapat et al.

(10) Patent No.: US 7,630,310 B2
(45) Date of Patent: Dec. 8, 2009

(54) SYSTEM AND METHOD FOR GENERATING ROUTE TARGET ATTRIBUTES

(75) Inventors: Swapna Bapat, Westford, MA (US); Chandrasekar Kathirvelu, Nashua, NH (US); Xin Zhou, Shrewsbury, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 705 days.

(21) Appl. No.: 11/344,944

(22) Filed: Jan. 31, 2006

(65) Prior Publication Data
US 2007/0177596 A1    Aug. 2, 2007

(51) Int. Cl.
H04L 12/26 (2006.01)
H04L 12/28 (2006.01)
H04L 12/66 (2006.01)
G06F 15/173 (2006.01)

(52) U.S. Cl. .............. 370/231; 370/235; 370/252; 370/255; 370/395.2; 370/395.53; 370/401; 370/409; 709/238

(58) Field of Classification Search .......... 370/231, 370/235, 252, 255, 395.2, 395.53, 401, 409; 709/238
See application file for complete search history.

(56) References Cited

U.S. PATENT DOCUMENTS

| | | | |
|---|---|---|---|
| 7,120,118 B2 * | 10/2006 | Rajagopal et al. | 370/237 |
| 7,373,660 B1 * | 5/2008 | Guichard et al. | 726/15 |
| 7,400,611 B2 * | 7/2008 | Mukherjee et al. | 370/338 |
| 7,433,320 B2 * | 10/2008 | Previdi et al. | 370/248 |
| 7,450,505 B2 * | 11/2008 | Buchanan et al. | 370/231 |
| 7,478,167 B2 * | 1/2009 | Ould-Brahim et al. | 709/238 |
| 7,558,263 B1 * | 7/2009 | Aggarwal et al. | 370/390 |
| 2004/0059829 A1 * | 3/2004 | Chu et al. | 709/238 |
| 2005/0188106 A1 * | 8/2005 | Pirbhai et al. | 709/238 |
| 2005/0286441 A1 * | 12/2005 | Huang | 370/254 |
| 2006/0045029 A1 * | 3/2006 | Ethier et al. | 370/260 |
| 2006/0215578 A1 * | 9/2006 | Andrapalliyal et al. | 370/254 |
| 2007/0133577 A1 * | 6/2007 | Dong | 370/401 |
| 2007/0140262 A1 * | 6/2007 | Wang | 370/395.52 |

OTHER PUBLICATIONS

E.C. Rosen et al., BGP/MPLS IP VPNs, RFC 2547bis, Sep. 2003.
T. Bates et al., Multiprotocol Extensions for BGP-4, RFC 2858, Jun. 2000.

* cited by examiner

Primary Examiner—Alpus H Hsu
(74) Attorney, Agent, or Firm—Brosemer, Kolefas & Assoc., LLC

(57) ABSTRACT

A system for, and method of, generating a minimum quantity of route target attributes is described. According to a method embodiment, a minimal set of unique permutations of data flows between sites of one or more Virtual Private Network (VPNs) is computed by comparing permutations of data flows to and from each site of a customer (i.e., variations of connectivity between sites) and identifying which permutation of data flows are unique while ignoring any duplicate permutations of data flows. Unique route target attributes are then generated, each route target attribute corresponding to a particular one of the unique permutations of data flows. Typically, the quantity of unique route target numbers generated is equal to the minimum quantity of unique permutations of data flows.

20 Claims, 5 Drawing Sheets

|     | HQ | DC | ENG | F1 | F2 | M | S1 | S2 |
|-----|----|----|-----|----|----|---|----|----|
| HQ  | X  | X  | X   | X  | X  | X | X  | X  |
| DC  | X  | X  |     |    |    |   |    |    |
| ENG | X  |    | X   | X  | X  |   |    |    |
| F1  | X  |    | X   | X  | X  |   |    |    |
| F2  | X  |    |     | X  | X  |   |    |    |
| M   | X  | Y  |     |    |    | X | X  | X  |
| S1  | X  |    |     |    |    | X | X  | X  |
| S2  | X  |    |     |    |    | X | X  | X  |

Fig. 3

SYSTEM AND METHOD FOR GENERATING ROUTE TARGET ATTRIBUTES

TECHNICAL FIELD

This invention relates to virtual private networks (VPNs), and in particular, to generating route target (RT) attributes for use with VPNs.

BACKGROUND

A virtual private network (VPN) provides secure communication across one or more shared core networks also referred to as backbones. A VPN service is provided by a Service Provider to a Customer sometimes referred to as an Enterprise. Increasingly Customers are contracting with a Service Provider to manage connectivity between sites. That is, the Customer desires to outsource their inter-site routing to the Service Provider. The Customer sends the Service Provider its routing information, and then relies on the Service Provider to distribute routing information to and from the other sites via one or more VPNs associated with the customer. Accordingly, from the customer's perspective, they may only view their internal routers communicating with their Customer Edge (CE) routers from one site to another through one or more VPNs managed by the Service Provider.

The Service Provider may operate and maintain each customer's inter-site routing connectivity through specific types of VPNs known as Border Gateway Protocol/Multi-protocol Label Switching IP VPNs (BGP/MPLS IP VPNs). These VPNs use the "Border Gateway Protocol" to distribute the routes, and "Multiprotocol Label Switching" to indicate which routes particular packets need to follow. Additional information about BGP/MPLS IP VPNs is articulated in Internet protocol proposal Request for Comment 2547 (RFC 2547) entitled "*BGP/MPLS VPN's*," by E. Rosen et al. (and subsequent industry drafts), which has gained acceptance in the industry.

When provisioning VPNs for a customer, the Service Provider configures what is known as its Provider Edge (PE) routers, which are routers that form part of the backbone of the Service Provider. Typically, PE routers connect with one or more CE routers at the customer's sites. A PE router is configured with a VRF table (Virtual Routing and Forwarding table), which is a table that stores routes available to particular sites connected to the PE router.

Route Target attributes are stored in VRF tables and allow a very fine degree of control over the distribution of routes among VRFs. This can be used to create extranets, or to enforce various customer policies. Particular Route Target attributes can be assigned to particular routes. Thus, Route Targets are the mechanisms that enable each PE router to only maintain routing information for the VPNs it is supporting. The use of Import Targets and Exports Targets also provides considerable flexibility in constructing a variety of VPN topologies. More information about Route Targets and encoding may be obtained as part of BGP Extended Communities attributes (see BGP Multi-Protocol Extensions specified in RFC 2848 from the Internet Engineering Task Force).

One area that has become problematic for Service Providers is the management of RT values. As the size and complexity of each customer's routes and polices increase, most Service Providers randomly generate RT values and assign them without further considerations. With larger customers, the quantity of RT values may become exceedingly large making assignment of RT values complicated and prone to errors. One of the challenges, from a Service Provider's perspective, is to effectively manage thousands of customers of varying sizes each potentially having multiple VPNs including a variety of VPN topologies such as bidirectional and/or unidirectional connections between sites. Reducing the amount of information associated with managing each customer's VPNs including RT attributes, can reduce the complexity and efficiency of managing hundreds of thousands of routes and many different customer policies and topologies.

SUMMARY

To address the above-discussed deficiencies associated with managing route target attributes today, this invention provides a system for, and method of, generating a minimum quantity of route target attributes. In one embodiment, a minimal set of unique permutations of data flows between customer sites of one or more Virtual Private Network (VPNs) is computed by comparing permutations of data flows to and from each site (i.e., variations of connectivity between sites) and identifying which permutation of data flows are unique. Unique route target attributes are then generated, each unique route target attribute corresponding to a particular one of the unique permutations of data flows. Whereas no new unique route target attributes are generated for duplicate permutations of data flows eliminating unnecessary redundancies. Typically, the quantity of unique route target numbers generated is equal to the minimum quantity of unique permutations of data flows.

As a result of the reduction of quantity of route target attributes, the complexity and amount of information associated with provisioning and managing BGP/MPLS VPNs per customer is substantially reduced. Accordingly, the present invention allows Service Providers to more efficiently and accurately manage BGP/MPLS VPNs for Customers. Further features and advantages of this invention may become apparent to those skilled in the art after reading the Detailed Description section in conjunction with the drawings.

BRIEF DESCRIPTION OF THE DRAWINGS

The detailed description is presented with reference to the accompanying figures. In the figures, the left-most digit(s) of a reference number identifies the figure in which the reference number first appears. Reference is now made to the following descriptions taken in conjunction with the accompanying drawings, in which:

FIG. 3 is an exemplary connectivity matrix.

DETAILED DESCRIPTION

Network Environment and Overview

A system for, and method of, generating a minimum quantity of Route Target (RT) attributes is described herein. This Detailed Description assumes the reader is familiar with basic Service Provider network architectures as well as the basics behind the Border Gateway Protocol Multi-protocol Label Switching BGP/MPLS VPNs, as described in Internet protocol proposal Request for Comment 2547 (RFC 2547) entitled "*BGP/MPLS VPN's*," by E. Rosen et al., and subsequent industry drafts, which have gained acceptance in the industry. For instance, it is assumed that those skilled in the art understand the common ways in which a customer network is typically attached to a Service Provider network using one or more Customer Edge (CE) devices which attach to Provider Edge (PE) routers via some sort of attachment circuit. Further, it should be appreciated by those skilled in the art that Service Provider networks can be implemented in a variety of different configurations using various different types of routers, devices, and switches.

BGP/MPLS IP VPNs are ideally suited for use with customers that desire to outsource the inter-site routing (e.g., routing between sites) to the SP. Typically, the customer does not understand nor want to know the physical backbone structure of the SP network. That is, the customer wants the SP to make the backbone and its internal routing completely transparent to the customer's own routing policies. Accordingly, the customer is usually not aware of any part of the SP's network, other than potentially PE routers and the customer sites that may attach to the customer site.

When submitting information to the Service Provider to provision and manage inter-site connectivity, the customer may only desire to describe their network to the SP in terms of "connectivity" requirements between sites within the customer's network. The connectivity requirements may include customer policies such as bidirectional and unidirectional connectivity and routing topology particulars.

Figure 1:
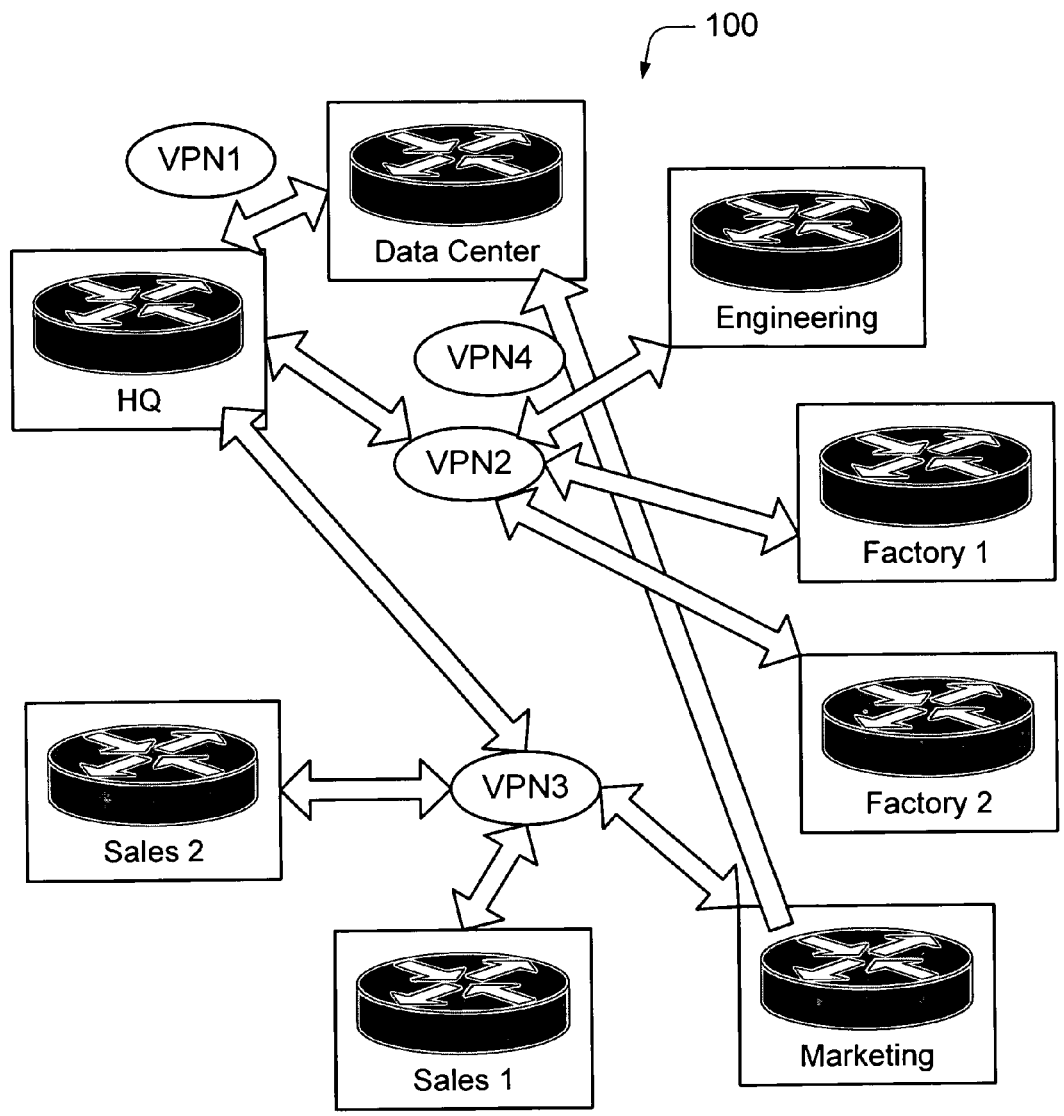
FIG. 1 shows site connectivity in a customer's network.
Figure 1:
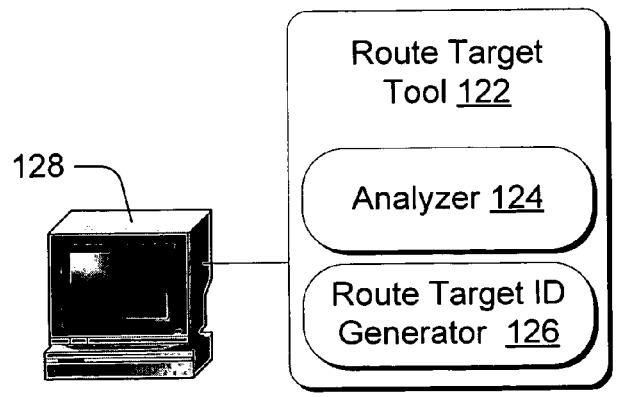

For example, FIG. 1 shows site connectivity of a customer's network 100. In particular, the customer desires that the SP provision four Virtual Private Networks (VPN1, VPN2, VPN3, and VPN4) to interconnect eight sites Head Quarters (HQ), data center, engineering, factory 1, factory 2, marketing, sales 1, and sales 2. As shown in FIG. 1, traffic flow (connectivity) between sites is bi-directional with the exception of VPN4 in which connectivity between marketing and the data center is unidirectional, with marketing only being able send data to the data center.

In this embodiment, the SP desires to configure the VPNs and various permutations of traffic flow between sites using BGP/MPLS IP VPNs using a minimal number of Route Target (RT) attributes. The route target attributes may be generated by a route target tool 122 in accordance with the present invention. It is appreciated by those skilled in the art having the benefit of this disclosure, that route target tool 122 may be implemented as part of a larger provisioning tool, although the following discussion will focus primarily on the generation of route target attributes generated by route target tool 122.

Reference herein to "one embodiment", "an embodiment", or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In one embodiment, route target tool 122 includes an analyzer 124 and a route target ID generator 124. Route target tool 122, as well as analyzer 124 and route target ID generator 124 are modules representing computer-executable instructions and/or logic that may be executed by any general purpose or special purpose computing device 128. A sample of such a computer device is described below with reference to FIG. 5.

Briefly, analyzer 124 is configured to compute a minimal set of unique permutations of data flows between sites of one or more Virtual Private Network (VPNs). As used herein unique permutations of data flows means unique instances of a bidirectional or unidirectional connections between one or more sites of the customer. Analyzer 124 is configured to receive permutations of data flows between the sites; compare the permutations to each other; and identify which is unique while ignoring any duplicate permutations. A route target ID generator 126, in conjunction with analyzer 124, is configured to generate a minimum quantity of unique Route Target attributes, each corresponding to a particular one of the unique permutations of data flows.

Exemplary Methods of Operation

Figure 2:
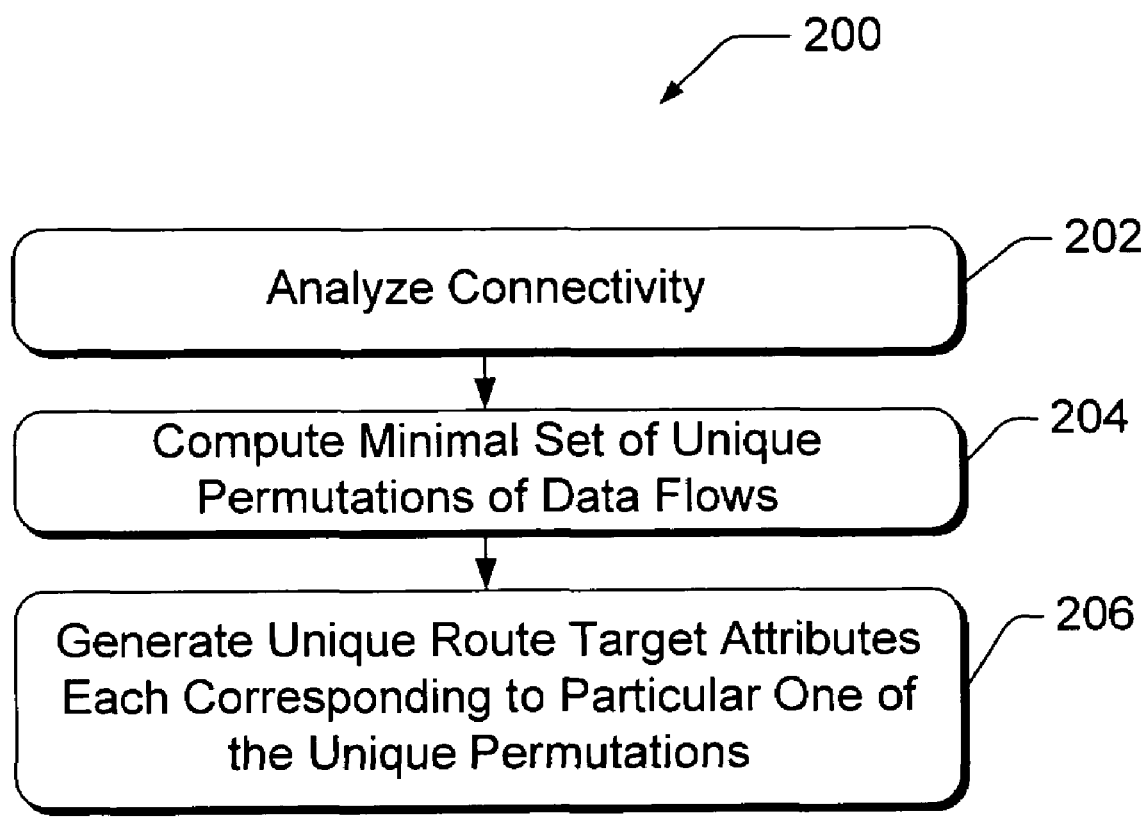
FIG. 2 illustrates an exemplary method for generating a minimum quantity of route target attributes.

FIG. 2 illustrates an exemplary method 200 for generating a minimal quantity of route target attributes. Method 200 includes blocks 202, 204 and 206 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In a block 202, once desired connectivity as represented in FIG. 1 is received from the customer, connectivity is listed to determine all connections (bidirectional as well as unidirectional) between sites of a customer's network. Typically, an analyzer 124 is configured to list all connections in a format, such as a table, for further processing and analysis.

For example, for purposes of understanding this discussion, a connectivity matrix 300 may be created by analyzer 124 as shown in FIG. 3. That is, connectivity matrix 300 lists all permutations of traffic flow between customer sites shown in FIG. 1 in a two dimensional array. An "X" in the matrix indicates there is a bidirectional connection between two sites corresponding at a particular row and column. Whereas, a "Y" in the matrix indicates there is a unidirectional connection between two sites corresponding at a particular row and column. An empty block indicates there no data flow (i.e., no connection) between sites.

In a block 204 a minimal set of unique permutations of data flows between sites of one or more Virtual Private Network (VPNs) is computed. For example, analyzer 124 is configured to determine the minimal set of unique permutations of data flows between sites. Again, unique permutations of data flows generally mean unique instances of bidirectional or unidirectional connections between one or more sites of the customer. This is determined by comparing permutations (variations) of data flows to and from each site; and identifying each permutation of data flow which is unique while ignoring any duplicate permutations of data flows.

In block 206, unique route target attributes each corresponding to a particular one of the unique permutations of data flows is generated. For example, route target ID generator 126 produces unique route target values each associated with a particular one of the unique permutations of data flows. These route target values (such as a number) may then be associated with sites of a customer site to facilitate bidirectional or unidirectional connectivity between the sites of a customer's network, such as shown in FIGS. 1 and 3. The route target attribute values may include an import route target attribute and/or an export route target attribute. The minimal quantity of route target attribute values may also be used when provisioning VPNs for the customer.

Figure 4:
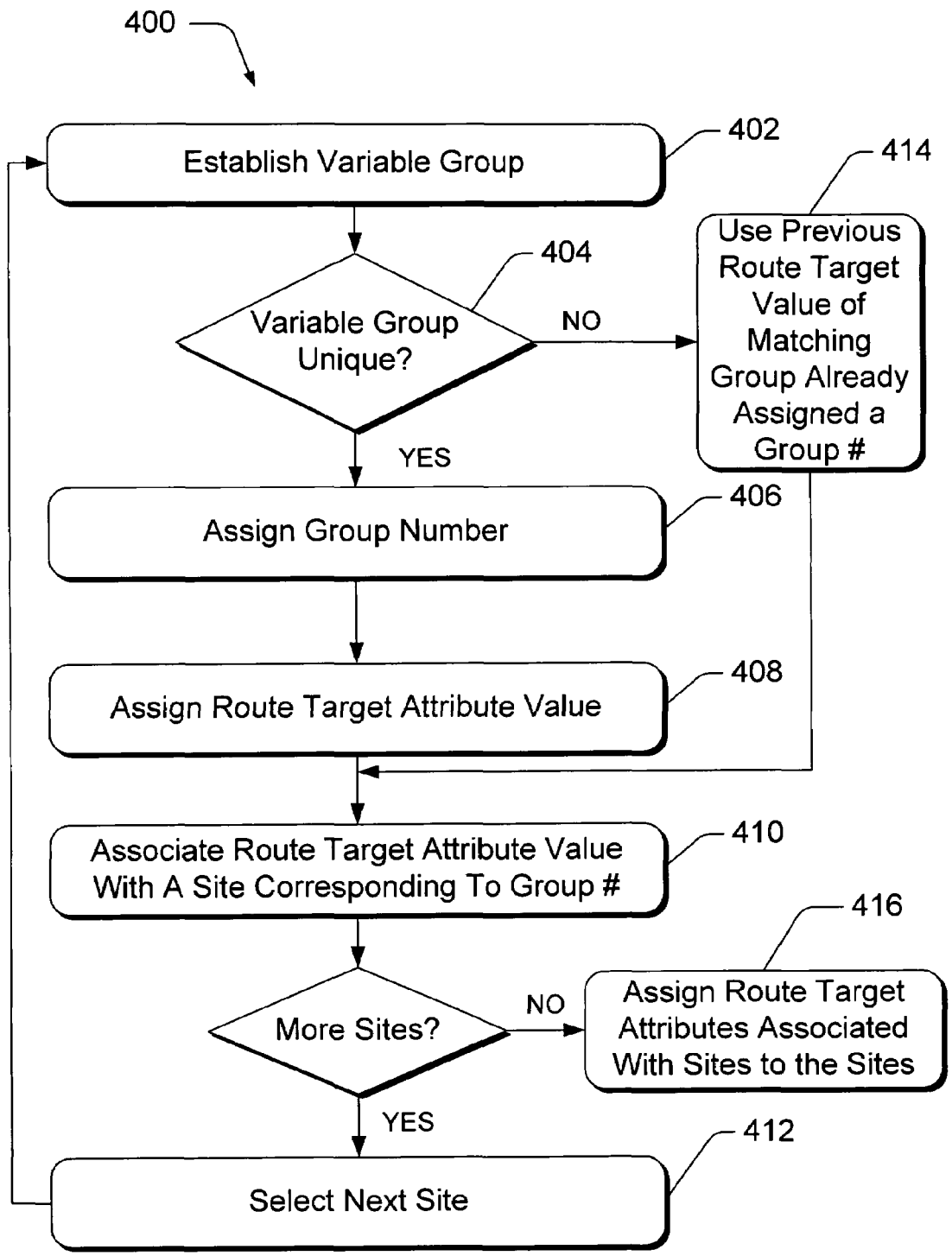
FIG. 4 illustrates an exemplary method for computing a minimal set of unique permutations of data flows between sites and generating route target attribute values corresponding to the minimal set for assignment to VRF tables of PE routers.

It will be appreciated by those skilled in this field and having the benefit of the present disclosure, that there are many ways to compute the minimal set of unique permutations of data flows between sites and assign route target attribute values. For example, FIG. 4 illustrates one method 400 for computing the minimal set of unique permutations of data flows between sites and generating route target attribute values. These route target attribute values may then be assigned to VRF tables (not shown) of PE routers (not shown) of a Service Provider's backbone.

Method 400 includes blocks 402, 404, 406, 408, 410, 412, 414, and 416. Each of the blocks represents one or more operational acts. The order in which the method is described is not to be construed as a limitation, and any number of the described method blocks can be combined in any order to implement the method. Furthermore, the method can be implemented in any suitable hardware, software, firmware, or combination thereof.

In block 402 of FIG. 4, a variable group (temporary group) called GX is created. Each group has an Import Route Target List and an Export Route Target list. For example, using the connectivity of a customer's network in FIGS. 1 and 3, it is possible to create a first variable group by examining connectivity to and from HQ. In this case, $$GX = \left\{ \begin{array}{l} \text{Export Target List: } HQ, DC; Eng, F1, F2, M, S1, S2; \\ \text{Import Target List: } HQ, DC, Eng, F1, F2, M, S1, S2 \end{array} \right\}$$

In block 404, a determination is made whether the temporary group (set of permutations of traffic flows) is unique. Since this is the first group and there are no other groups to compare it to, it is determined to be unique. Therefore, according to the YES branch of decisional block 404, method 400 proceeds to block 406. If the group was not unique, method 400 would have proceeded to block 412, which shall be explained in more detail below.

In block 406, since the group was determined to be unique, it is assigned a group number. For example, GX equals G0. The actual values used herein are for illustration purposes, and other suitable values or indicia could be generated if a group is determined to be unique.

In block 408, a route target attribute value is also assigned. For example, a route target number 2020 is assigned to group G0. Different route target numbers could be assigned to the export and import route target list, but for simplicity herein, identical route target numbers are assigned to both lists if the Group is unique. It should again be appreciated that the actual value of the route target value used herein is for illustrative purposes, and it is expected that many other suitable values may be assigned to the group.

In block 410, the route target attribute value is associated with the site which was just analyzed and determined unique. So according to this example, 2020 is the route target attribute value assigned to HQ. In one embodiment route target ID generator 126 (FIG. 1) produces unique route target values each associated with a particular one of the unique permutations of data flows.

In a block 412, a next site is selected for connectivity analysis and method 400 repeats proceeding back to block 400. For example, returning back to block 402 the next site selected is the data center. The variable group GX is created:

$$GX = \left\{ \begin{array}{l} \text{Export Target List: } HQ, DC; \\ \text{Import Target List: } HQ, DC, M \end{array} \right\}$$

In block 404 a decision is made whether this group unique. Accordingly, temporary group GX is compared to G0. Since GX in this scenario is different from G0, then according to the YES branch of block 404 method 400 proceeds to block 406.

Still referring to the example of FIG. 1, in block 406, G1 is assigned to the group. Then, in block 408 a route target number of 2030 is assigned to group G1. In block 410, the route target attribute value is associated with the site which was just analyzed which is DC.

In a block 412, a next site is selected for connectivity analysis and method 400 repeats proceeding back to block 402.

For example, returning back to block 400 the next site selected is Engineering (Eng) (FIG. 1). After performing, steps 402, 404, 406 408, 410 with reference to connectivity to and from Engineering it is determined that $$GX = \left\{ \begin{array}{l} \text{Export Target List: } HQ, Eng, F1, F2 \\ \text{Import Target List: } HQ, Eng, F1, F2 \end{array} \right\}$$

Accordingly, GX when compared to G0 and G1 is unique and therefore a group G2 is generated associated with set of data flows and a route target number 2040 is associated with the G2={ETL: HQ, Eng, F1, F2

ITL: HQ, Eng, F1, F2}.

In block 412, a next site is selected for connectivity analysis and method 400 repeats proceeding back to block 400. In this case, Factory 1 (F1) is selected.

In block 402, the variable group GX is created for the next location F1

$$GX = \left\{ \begin{array}{l} ETL: HQ, Eng, F1, F2 \\ ITL: HQ, Eng, F1, F2 \end{array} \right\}$$

In block 404 a decision is made whether this group is unique. Since this temporary group is the same as G2, then according to the NO branch of block 404 method 400 proceeds to block 414.

In block 414, the set of permutations of data flows comprising GX is not unique and is therefore ignored as it matches G2 and is redundant. That is, rather than assign a new Group and new route targets, the route target attribute associated with the matching group G2 is also associated with the site F1. Thus, the identical number 2040 associated with Engineering (FIG. 1) is used as the route target attribute value assigned to F1. Method 400 proceeds to block 410 and in block 412 the process repeats returning back to block 402.

For example, returning back to block 400 the next site selected is site F2. After performing, steps 402, 404, 414, 416 with reference to F2 it is determined that the temporary group for F2 is identical to G2. Accordingly the route target number associated with G2, which is 2040 is assigned to F2 as well.

After analyzing all the sites using method 400 it is determined that for the next location, Marketing, its group is unique. Thus, $$G3 = \begin{Bmatrix} ETL: \; HQ, DC, M, S1, S2 \\ ITL: \; HQ, M, S1, S2 \end{Bmatrix}$$

And a route target number 2050 is assigned to Marketing.

For the next location Sales 1 (S1)

$$GX = \begin{Bmatrix} ETL: \; HQ, M, S1, S2 \\ ITL: \; HQ, M, S1, S2 \end{Bmatrix}$$

Since this set is unique $$G4 = \begin{Bmatrix} ETL: \; HQ, M, S1, S2 \\ ITL: \; HQ, M, S1, S2 \end{Bmatrix}$$

And, a route target number of 2060 is assigned to S1. For the next location Sales 2, it is obvious from the matrix (FIG. 3) that the group for this location is the same as G4. Thus, 2060 is assigned to S2 as well.

Now, in a block 416 route target attributes may be assigned to sites in as both part of Import Route Target Lists and Export Route Target Lists. These values can then be configured by the Service Provider into every PE router in which the customer's CE routers connect.

For example, $$HQ = \begin{Bmatrix} \text{Export Route Target}(ERT): \; 2020, 2030, 2040, 2050, 2060 \\ \text{Import Rout Target}(IRT): \; 2020, 2030, 2040, 2050, 2060 \end{Bmatrix}$$

$$DC = \begin{Bmatrix} ERT: \; 2020, \\ IRT: \; 2020, 2030 \end{Bmatrix},$$

since DC is not present in both ETL and ITL of G3, it is necessary to remove the Route Targets associated with G3 from the Export Route Target list.

$$Eng = \begin{Bmatrix} ERT: \; 2020, 2040 \\ IRT: \; 2020, 2040 \end{Bmatrix}$$

$$F1 = \begin{Bmatrix} ERT: \; 2020, 2040 \\ IRT: \; 2020, 2040 \end{Bmatrix}$$

$$F2 = \begin{Bmatrix} ERT: \; 2020, 2040 \\ IRT: \; 2020, 2040 \end{Bmatrix}$$

$$M = \begin{Bmatrix} ERT: \; 2020, 2030, 2050, 2060 \\ IRT: \; 2020, 2050, 2060 \end{Bmatrix}$$

$$S1 = \begin{Bmatrix} ERT: \; 2020, 2050, 2060 \\ IRT: \; 2020, 2050, 2060 \end{Bmatrix}$$

Exemplary System Platform For Generating Route Target Attributes

Any functionality provided by a route target generator tool 122 (FIG. 1) and the methods 200 (FIG. 2) and 400 (FIG. 4) can be implemented in any general purpose or special purpose computing system. Examples of well known computing systems, environments, and/or configurations that may be suitable for use to generate route target attributes for a provisioning VPNs include, but are not limited to, personal computers, server computers, multiprocessor systems, microprocessor-based systems, network computers, routers, minicomputers, mainframe computers, distributed computing environments or devices that include any of the above systems or devices, and the like.

Additionally, any exemplary functionality provided by a route target generator system may be described in the general context of computer-executable instructions, such as program modules, being executed by a computer. Generally, program modules include routines, programs, objects, components, data structures, logic, and other executable data that perform particular tasks or implement particular abstract data types. Program modules may be located in local, remote, and/or distributed computer storage media including memory storage devices.

Figure 5:
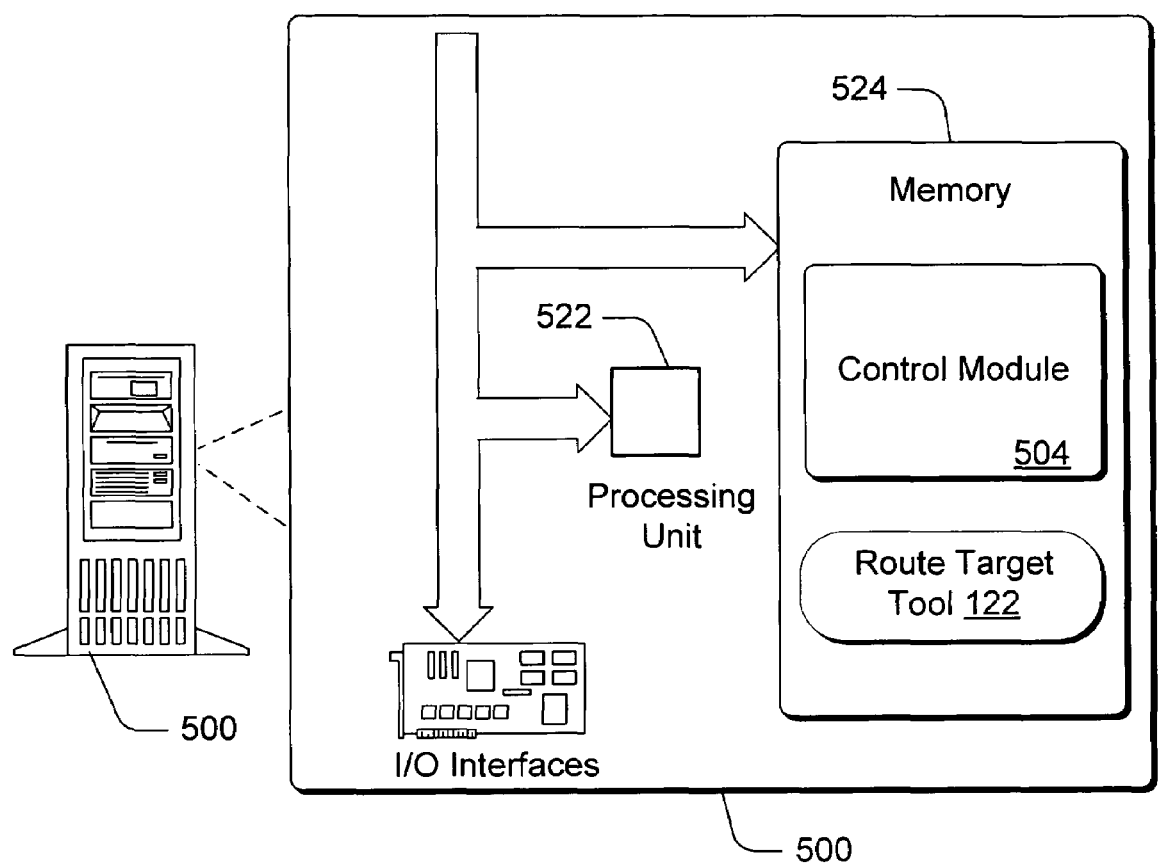
FIG. 5 illustrates an exemplary physical representation of a computer platform used to implement functionality performed by an innovative route target generator tool described herein.

FIG. 5 illustrates an exemplary physical representation of a computer platform 500 used to implement functionality performed by route target generator tool 122 (FIG. 1). In particular, computer platform 500 represents any general purpose or special purpose computing system with modifications to hardware, firmware, and/or software. Computer platform 500 is only one example of computer platform and is not intended to suggest any limitation as to the scope of use or functionality of any system or method described herein. Neither should the computer platform 500 be interpreted as having any dependency or requirement relating to any one or combination of components described herein.

Computer platform 500 includes a control module 504, which controls the operation of platform 500. Control module 504 can be implemented in hardware, firmware, logic, software, or any combination of thereof. In the illustrative exemplary implementation control module 504 is implemented as a program module that may be described in the general context of computer-executable instructions, being executed by a computer, i.e., one or more processors in a processing unit 522. Control module 504 resides in memory 524.

Memory 524 typically includes a variety of computer readable media. Such media can be any available media that is accessible by computer platform 500 and includes both volatile and non-volatile media, removable and non-removable media. The computer-readable media provide non-volatile storage of computer readable instructions, data structures, program modules, and other data for computer platform 500. Any number of program modules can be stored in the computer readable media of memory 524, including one or more portions of control module 504.

It is also noted that portions of control module 504 may be stored in a remote memory storage device remote from computer platform 500. Additionally, even though control module 504 is illustrated herein as a discrete block, it is recognized that any of these components may reside at various times in different storage components of computer platform 500 and are executed by one or more processors of a computer, such as processing units 522.

A route target attribute tool 122 is typically stored in control module 504 of the computer platform 200. For example, in one implementation, route target attribute tool 122 represents computer-executable instructions executed by a processing unit 522 of a computer, but could also be implemented in hardware or any combination of hardware, firmware, logic, and software.

Although route target attribute tool 122 is shown as a single block, it is understood that when actually implemented in the form of computer-executable instructions, logic, firmware, and/or hardware, that the functionality described with reference to it may not exist as separate identifiable block. Additionally, route target attribute tool 122 may also be integrated with other components or as a module in a larger system, such as provisioning software and systems.

The embodiments described herein are to be considered in all respects only as exemplary and not restrictive. The scope of the invention is, therefore, indicated by the subjoined claims rather by the foregoing description. All changes which come within the meaning and range of equivalency of the claims are to be embraced within their scope.

What is claimed is:

1. A method of generating route target attributes, comprising:
    computing with an analyzer a minimal set of unique permutations of data flows between sites of one or more Virtual Private Network (VPNs); and
    generating with a route target ID generator unique route target attributes, each unique route target attribute corresponding to a particular one of the unique permutations of data flows.

2. The method as recited in claim 1, wherein the act of computing the minimal set of unique permutations comprises comparing permutations of data flows to and from each site; and identifying each permutation of data flows which are unique.

3. The method as recited in claim 1, wherein the act of generating the unique route target attributes comprises producing a quantity of unique route target numbers equal to a quantity of unique permutations of data flows.

4. The method as recited in claim 1, wherein a route target attribute is at least one of an import route target attribute and an export route target attribute.

5. The method as recited in claim 1, wherein a data flow includes unidirectional and/or bidirectional VPN traffic to and/or from a site.

6. The method as recited in claim 1, further comprising associating each of the generated unique route target attributes with one or more of the sites.

7. The method as recited in claim 1, further comprising using the minimal quantity of unique route target attributes when provisioning one or more of the VPNs.

8. The method as recited in claim 1, wherein a permutation includes a list of data flows to and/or from each site.

9. In a Service Provider (SP) network comprising a plurality of Provider Edge (PE) routers providing Virtual Private Network (VPN) connectivity between customer sites each site having one or more customer edge (CE) devices, a method for generating route target attributes, comprising:
    analyzing with an analyzer lists of data flows to and from each site;
    identifying the lists of data flows to and from each site which are unique; and
    generating with a route target ID generator unique route target attributes corresponding to the lists of data flows identified as unique.

10. The method as recited in claim 9, wherein the route target attributes are at least one of an import route target attribute and an export route target attribute.

11. The method as recited in claim 9, further comprising associating each of the generated route target attributes with one or more of the sites.

12. The method as recited in claim 9, wherein each VPN is a Border Gateway Protocol/Multi-Protocol Label Switching IP-VPN.

13. A system for configuring an Internet protocol based, virtual private network comprising:
    an analyzer configured to compute a minimal set of unique permutations of data flows between sites of one or more Virtual Private Network (VPNs); and
    a route target ID generator configured to generate a minimum quantity of unique route target attributes, each of the unique route target attributes corresponding to a particular one of the unique permutations of data flows.

14. The system as recited in claim 13, wherein the analyzer is further configured to receive permutations of data flows between the sites; compare the permutations to each other; and identify each permutation which is unique while ignoring any duplicate permutations.

15. The system as recited in claim 13, wherein the route target ID generator is further configured to produce a quantity of unique route target numbers equal to a quantity of unique permutations of data flows.

16. The system as recited in claim 13, wherein the analyzer and route target ID generator are modules in the form of computer-executable instructions configured for execution by a computing device.

17. The system as recited in claim 13, wherein a route target attribute is at least one of an import route target attribute and an export route target attribute.

18. The system as recited in claim 13, wherein a data flow includes unidirectional and/or bidirectional VPN traffic to and/or from a site.

19. The system as recited in claim 13, wherein the route target ID generator is further configured to associate each of the generated unique route target attributes with one or more of the sites.

20. The system as recited in claim 13, wherein a permutation includes a list of data flows to and/or from each site.

* * * * *

UNITED STATES PATENT AND TRADEMARK OFFICE
CERTIFICATE OF CORRECTION

PATENT NO. : 7,630,310 B2 Page 1 of 1
APPLICATION NO. : 11/344944
DATED : December 8, 2009
INVENTOR(S) : Bapat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Twenty-first Day of December, 2010

David J. Kappos
*Director of the United States Patent and Trademark Office*